US007710929B2

(12) United States Patent
Moreton et al.

(10) Patent No.: US 7,710,929 B2
(45) Date of Patent: May 4, 2010

(54) METHOD OF CONTROLLING ACCESS TO A COMMUNICATIONS MEDIUM

(75) Inventors: Michael John Vidion Moreton, Marlborough (GB); Andrew Frederick Watts, Charvil (GB)

(73) Assignee: Synad Technologies Limited, Berkshire (GB)

( * ) Notice: Subject to any disclaimer, the term of this patent is extended or adjusted under 35 U.S.C. 154(b) by 1191 days.

(21) Appl. No.: 10/428,896

(22) Filed: May 2, 2003

(65) Prior Publication Data

US 2004/0013128 A1    Jan. 22, 2004

(30) Foreign Application Priority Data

Jul. 19, 2002 (GB) .................................. 0216843.3
Oct. 11, 2002 (GB) .................................. 0223762.6

(51) Int. Cl.
    *H04W 4/00*     (2009.01)
(52) U.S. Cl. ...................................... 370/338; 370/442
(58) Field of Classification Search ................. 370/412, 370/413, 438, 447, 498, 912, 913, 338, 442; 455/3.01, 73, 78, 88, 426.2, 463, 500, 525, 455/432, 434, 435, 552.1, 562.1
See application file for complete search history.

(56) References Cited

U.S. PATENT DOCUMENTS 5,960,344 A * 9/1999 Mahany ................... 455/432.2
6,895,255 B1 * 5/2005 Bridgelall ................ 455/552.1
7,058,074 B2 * 6/2006 Ho et al. ...................... 370/447
7,164,671 B2 * 1/2007 del Prado et al. ............ 370/338
2002/0164963 A1   11/2002 Tehrani et al.

FOREIGN PATENT DOCUMENTS

| EP | 1 119 137 A1 | 7/2001 |
| EP | 1 199 842 A2 | 4/2002 |
| WO | WO 02/41586 A2 | 5/2002 |
| WO | WO 03/005653 A1 | 1/2003 |
| WO | WO 03/026221 A1 | 3/2003 |

OTHER PUBLICATIONS

Great Britain Search Report for GB 0308125.4, date of search: Jun. 27, 2003, 3 pages.

* cited by examiner

*Primary Examiner*—Kevin C Harper
*Assistant Examiner*—Leon Andrews
(74) *Attorney, Agent, or Firm*—Blakely, Sokoloff, Taylor & Zafman LLP

(57) ABSTRACT

A multi-mode access point (AP) and a method of controlling access between that AP and one or more clients is disclosed. In a first time period, the AP commands the client(s) not to send data on a first channel, using, for example, the 802.11a Wireless Local Area Network (WLAN) Standard. The AP is enabled, in that first time period, to receive data on a second channel using say, the 802.11b WLAN standard. At the end of the first time period, the AP switches so that the first channel is commanded to be silent while data can instead be sent via the second channel. Data queuing for a given channel can take place at the or each client when that channel is commanded to be silent, for subsequent transmission when that channel is enabled again.

25 Claims, 8 Drawing Sheets

METHOD OF CONTROLLING ACCESS TO A COMMUNICATIONS MEDIUM

CROSS-REFERENCE TO OTHER APPLICATIONS

This Application claims priority from United Kingdom Patent Application No. 0216843.3, filed on Jul. 19, 2002, and United Kingdom Patent Application No. 0223762.6, filed on Oct. 11, 2002.

FIELD OF THE INVENTION

The invention relates to wireless Local Area Networks (WLANS), in particular, dual or other multiple mode Access Points.

BACKGROUND TO THE INVENTION

Wireless Local Area Networks (WLANs) have become the focus of intense research efforts owing to the user's growing necessity to have greater connectivity to a myriad of wired and wireless networks, and hence greater mobility. Wireless networking products such as personal computers (PCs), laptops and other portable devices incorporate a Network Interface Card (NIC), which provides connection via a wireless medium to other such devices.

IEEE 802.11 is a standard, hereinafter referred to as "802.11", developed by the Institute of Electronic and Electrical Engineers (IEEE) for operation of wireless LAN devices currently covered within the 2.4 GHz and 5 GHz bands but, which can be extendable to other bands. The most common architecture of an 802.11 LAN is a group of stations (STAs) or clients, for example a group of PCs and/or laptops, and an Access Point (AP) that provides access to other networks, such as wired networks, by controlling connection of stations to the LAN. The AP also provides data forwarding services for the stations: frames are not passed directly between stations but always go via the AP. This is known as an infrastructure mode. An alternative wireless architecture where the LAN does not include an AP is called an Independent Basic Service Set (IBSS).

A wireless network enables the transfer of information from one device to another by the implementation of several functions including: a medium which provides a data transmission path; Medium Access Control (MAC) protocol to define how stations share a common medium; synchronisation and error control protocols to ensure that data transfer within each link in the network is intact; encryption services for secure data transmission; mechanisms for transferring the data from the source to the recipient; and connectivity software for interfacing an appliance to application software on a server.

FIG. 1 shows the logical architecture of the 802.11 standard that applies to each station. The fundamental purpose of the MAC layer 10 is to provide access control functions for shared medium Physical Layers (PHYs) 20 in support of the LLC (logical link control) layer 30, with Network and Upper layers 40 above the LLC layer.

Before transmitting a frame, the MAC co-ordination of an 802.11 wireless LAN takes measures to avoid collisions by using one of two protocols, for example, carrier sense multiple access/collision avoidance (CSMA/CA). Within the 802.11 standard this mode is specified as the Distributed Coordination Function (DCF), which is a contention-based protocol. Another mode is the priority-based Point Coordination Function (PCF) which is a contention-free access protocol for infrastructure mode configurations.

The 802.11 standard outlines the media access control (MAC) and the physical layer (PHY) layer specifications for wireless LANs. 802.11 utilises three transmission technologies including Direct Sequence Spread Spectrum (DSSS) and Frequency Hopping Spread Spectrum (FHSS). Moreover, the DSSS system of the 802.11 standard operates at data rates of 1 Mbps and 2 Mbps only. Products conforming strictly to the 802.11 standard operate in the 2.4 GHz ISM band between 2.4000 and 2.4835 GHz.

With subsequent developments in the technology, the DSSS wireless LANs could exchange data at up to 11 Mbps, a consequence of which was that devices had problems with interoperability and implementation under 802.11.

More specifically, the IEEE802.11b standard, hereinafter referred to as '802.11b', emerged from 802.11 as the "high rate" and Wi-Fi™ standard specifying the DSSS system to operate at 1, 2, 5.5 and 11 Mbps. The 802.11b compliant devices operate in only the 2.4000 GHz ISM band between 2.4000 and 2.4835 GHz. The IEEE 802.11a standard, hereinafter referred to as '802.11a', for device operability at the higher 54 Mbs rate in the 5 GHz band, can support even higher data rates owing to the implementation of Orthogonal Frequency Division Modulation (OFDM).

Consequently, two major variants have emerged from the IEE802.11 specifications, namely the 802.11b and 802.11a standards. The 802.11b standard operating on the 2.4 GHz band is the most prevalent but is limited to a peak data rate of 11 Mbps available on a limited number of channels, while the higher data rate 802.11a network operating on the broader 5 GHz band has a greater number of channels than 802.11b. The new 802.11a standard offers a higher peak data rate of 54 Mb/s by implementing OFDM.

Hitherto, most products have been 802.11b-compliant and therefore use the 2.4 GHz band, and currently there are few 802.11a-compliant products on the enhanced 5 GHz band. Hence the principal problem in this context facing the information technologist is that network administrators who have a large network of existing 802.11b users will not all be able to upgrade from 802.11b to 802.11a simultaneously in order to exploit the higher data rates available on the latter. The feasibility of the upgrade poses a considerable burden to network administrators as upgrading all stations from 802.11b to 802.11a is not economical and/or practical.

Most recently, yet a further variant on the IEE 802.11 specification has been proposed, the 802.11g standard. This employs the same band as the 802.11b standard, but is, in certain modes, incompatible with it. It is conceivable that further non-interoperable and/or interfering standards may be developed in the future. This will increase still further the difficulty of integration.

The current invention provided for a solution to the problems of the prior art.

SUMMARY OF THE INVENTION

According to a first aspect of the present invention there is provided a method of controlling access between a dual mode access point for a Wireless Local Area Network (WLAN), and first and second client transceivers located in at least one client, the first and second client transceiver being operable to communicate with the Access Point over a first and second channel respectively, the method comprising the steps of commanding the or each said first client transceiver not to transmit at least one frame of data to the access point for a first predetermined length of time, switching the access point to receive at least one first frame of data from the or each said second client transceiver for the first predetermined length of time, commanding the or each said second client transceiver, prior to the expiration of said first predetermined length of time, not to transmit at least one second frame of data to the access point for a second predetermined length of time and switching the access point, upon expiration of said first predetermined length of time, to receive the or each second frame from the or each said first client transceiver for said second predetermined period of time.

The advantage of the current invention is that, by invoking temporal commands using only one medium access control (MAC) layer, two physical layers corresponding to two networks can be supported simultaneously, although appearing to be on one network.

In a preferred embodiment, where there may be a plurality of clients, the method further comprises the step of communicating between at least one of the clients and the access point only over the said first channel.

In yet a further embodiment, where there may be a plurality of clients, the method further comprises the step of multiple clients communicating between at least one of said clients and the access point only over said second channel.

In a preferred embodiment, where the, or one of the, clients may comprise both first and second client transceiver, the method further comprises communicating between an access point and at least one client using both the first and second channels.

In yet a further preferred embodiment, the method may further comprise the steps of storing, in a queue, at the or each first client transceiver, the first frame not transmitted by the first client transceiver during the first predetermined length of time, respectively and transmitting, after the expiration of said first predetermined length of time, at least one of said queued first frame from the first client transceiver to the access point.

In a preferred embodiment, the method may further comprise the steps of storing, in a queue, at the or each second client transceiver, the second frame not transmitted by the second client transceiver during the second predetermined length of time and transmitting, after the expiration of said second predetermined length of time, at least one of said queued second frames from the second client transceiver to the access point.

Preferably, the method may further comprise the step of including data indicative of either said first or second predetermined length of time in at least one of the first or second frames.

Alternatively, the method may comprise the step of transmitting time data between said first client transceiver of a first client and of said first client transceiver of a second client, the time data being indicative of either the first or second predetermined length of time.

Preferably, where said data is a non zero value, the method may further comprise the steps of altering the non zero value by a predetermined amount and transmitting the or each frame when said value reaches a predefined value.

Preferably, said data may be a Network Allocation Vector (NAV) value.

Preferably, the first and second predetermined length of time may divided into a True Contention Free Period and a False Contention Free Period.

In a second aspect of the present invention, there is provided a dual mode access point for controlling the access of first and second client transceivers located in at least one client, to a Wireless Local Area Network (WLAN), the access point comprising a first and second access point transceiver arranged to communicate with the or each first and second client transceiver on a first and second channel, respectively and an access point Medium Access Control layer, coupled to the first and second access point radio transceiver, arranged to switch the second access point radio transceiver to receive at least one frame exclusively from the or each said second client transceiver during a first predetermined length of time and upon expiration of said first predetermined length of time, being further arranged to switch the first access point radio transceiver to exclusively receive the or each frame from only the or each said first client transceiver for a second predetermined period of time.

In a preferred embodiment, the access point Medium Access Control layer may be further arranged to instruct the first access point radio transceiver to transmit a first command signal to the or each said first client transceiver, the first command signal instructing said first client transceiver not to transmit at least one first frame of data to the access point for said first predetermined length of time; said access point Medium Access Control layer being further arranged to instruct the second access point radio transceiver to transmit a second command to the or each said second client transceiver, prior to the expiration of said first predetermined length of time, the command signal instructing said second client transceiver not to transmit the or each frame to the access point for said second predetermined length of time.

In a preferred embodiment, the access point may further comprise storage means, accessible by said first and second access point radio transceiver, arranged to store, in a queue, the frames not transmitted to the first or second client transceiver during the first or second predetermined length of time, respectively.

Preferably, there may be provided an access point wherein said first or second access point radio transceiver is arranged to transmit to the first or second client transceiver, during the second or first predetermined length of time respectively, the frames not transmitted thereto during said first or second predetermined length of time respectively.

Preferably there may be provided a Wireless Local Area Network client, for communicating with at least an Access Point according to the present invention, the client comprising at least one first client transceiver arranged to communicate with said access point using a first channel and a first client Medium Access Control layer, in communication with the or each first client transceiver, arranged to instruct the or each said first client transceiver not to transmit at least one first data frame to the access point for a first predetermined length of time.

Preferably, there may be provided a client that further comprises at least one second client transceiver, in communication with a second client Medium Access Control layer, the second client transceiver being arranged to communicate with said second access point radio transceiver using a second channel and the second client Medium Access Control layer being arranged to instruct the or each said second client transceiver, prior to the expiration of said first predetermined length of time, not to transmit at least one second data frame to the access point for a further, second, predetermined length of time.

In a preferred embodiment, there is provided a client wherein the first and second client Medium Access Control layer may be further arranged to switch the first and second client transceiver to transmit the first or second data frame to the access point in accordance with the access point switching the first and second access point transceivers to receive said data frame from the first and second client transceiver, respectively.

Preferably, the client may further comprise client storage means, in communication with the first client Medium Access Control layer, arranged to store, in a queue, the frames not transmitted by the first client transceiver, during the first predetermined length of time.

Preferably, the client storage means may be in communication with the second client Medium Access Control layer, where said client storage means may be further arranged to store, in a queue, the frames not transmitted by the second client transceiver, during the second predetermined length of time.

Preferably, the first client Medium Access Control layer may be further arranged to instruct said first access point radio transceiver to transmit a first client command signal to the or each said first client transceiver in at least one other client, the first station command signal instructing said first client transceiver not to transmit said first data frame to the access point for said first predetermined length of time.

In a preferred embodiment, said second client Medium Access Control may be further arranged to instruct said second access point radio transceiver to transmit a second command signal to the or each said second client transceiver in the or each other client, prior to the expiration of said first predetermined length of time, the second client command signal instructing said second client transceiver not to transmit said second data frame to the access point for said second predetermined length of time.

Preferably, when said first or second predetermined length of time is represented by a non zero number, the station further may comprise counting means arranged to alter the value of said non zero value by a predefined value thereby generating a resultant value and wherein, the first client transceiver transmits said first data frame when said resultant value reaches a predetermined value.

In a preferred embodiment, there may be provided a network that comprises a server in communication with at least one access point according to the present invention.

Whilst the invention is particularly suitable for use with two channels, using a dual mode access point, it is to be understood that the invention is not so limited. For example, a multi-mode access point may be employed to allow interleaving of data on three or even more channels for example, using 802.11a, b, and g.

According to still a further aspect of the present invention, therefore, there is provided a method of controlling access between a multi-mode access point for a Wireless Local Area Network (WLAN), and a plurality of transceivers located in at least one client, the plurality of transceivers each being operable to communicate over a respective one of a plurality of channels respectively; the method comprising the steps of: (a) commanding a first of the transceivers in the or each client to transmit data frames to the access point for a first predetermined length of time $t_0$, whilst the remaining transceivers are ordered not to transmit data frames; (b) switching the access point to receive, during $t_0$, one or more data frames from that transceiver of the plurality which has been commanded to transmit data frames during $t_0$; (c) prior to the expiration of the length of time $t_0$, commanding that transceiver which is transmitting data frames during $t_0$ not to transmit data frames to the access point during a second predetermined length of time $t_1$, and commanding another one of the transceivers, which is during $t_0$ not transmitting data frames, to transmit during that time period $t_1$ instead; and (d) switching the access point, upon expiration of the time $t_0$, to receive data frames from that said other one of the transceivers during the time period $t_1$, whilst transmission from the transceiver that transmitted during time period $t_0$ is suppressed.

The invention also extends to a multi-mode access point operable in accordance with that method.

BRIEF DESCRIPTION OF THE DRAWINGS

An embodiment of the present invention will now be described by way of example only with reference to the accompanying drawings, which are listed below.

A SPECIFIC DESCRIPTION OF A PREFERRED EMBODIMENT OF THE PRESENT INVENTION

Figure 1:
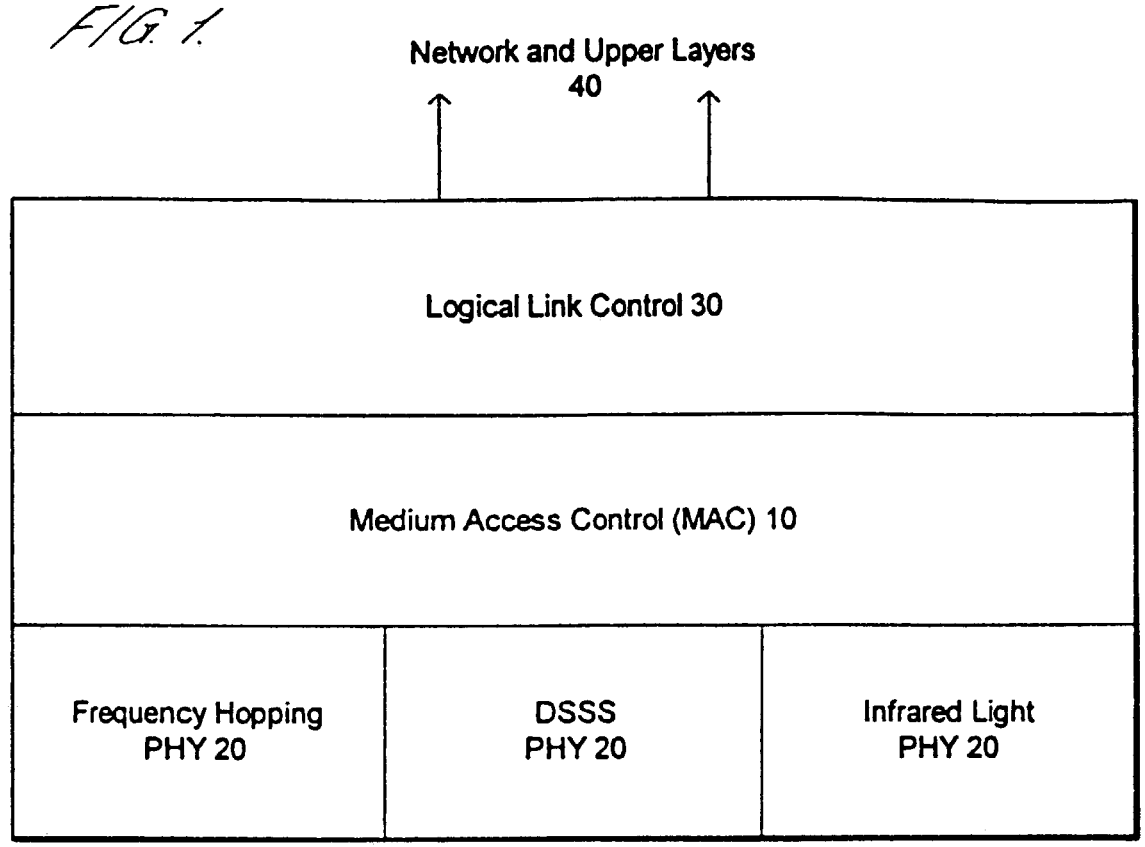
FIG. 1 shows the lower protocol layers and the network layer of a known 802.11 station.

In the ensuing text, a full description of the IEEE 802.11 wireless network standard is omitted, it being understood that this forms part of the general knowledge of the skilled addressee.

The current invention provides for a smooth and transparent transition from one wireless networking standard to the next to enable users operability whatever the network media. It is an object of the present invention to provide a solution to this problem. The network administrator must provide access to both 2.4 GHz and 5 GHz band stations simultaneously, with the balance between the two varying over time.

It is therefore an object of the present invention that the network APs support both 802.11a and 802.11b simultaneously with the balance between the two varying over time. In particular, the invention describes a way in which a single access point can be used to service both 2.4 GHz and 5 GHz stations at the same time, and in proportions that can be manually or automatically varied.

A wireless LAN station needs to access an access point in order to initiate the transfer of data to other network systems. In accordance with the standard, 802.11 stations can be serviced on only one channel at any one time, that is, the stations are being serviced, for example, on channel A or channel B. It is an object of the current invention to address this problem by providing for a method which enables a station or a group of stations to be serviced on channel A and B simultaneously, whilst appearing to the network to be serviced on only one channel.

This problem could be addressed by using two interfaces or Medium Access Controls (MACs) within the APs to accommodate 802.11b and 802.11a devices or stations; however, this would require the incorporation of additional hardware most probably in duplication, and hence incur additional expenses. The object of the current invention is to provide for an access point having a single interface or MAC layer that can support 802.11b and 802.11a devices simultaneously; hence, providing an advantageous cost effective solution.

Most current 802.11-compliant stations use the 2.4 GHz band, and stations that can use the 5 Ghz band are just beginning to become available. Another simple resolution to the problem could be to roll out a parallel network of 5 GHz access points. While this may be the best solution for existing networks, the disadvantage is that it is less suitable where the coverage area needs to be extended, as both 2.4 GHz and 5 GHz access points will need to be added.

Dual band chipsets exist that can be incorporated into APs or wireless Network Interface Cards (NICs) for use in portable and/or mobile devices such as PCs or laptops and the like, which can be used for accessing channels on either the 2 GHz or 5 GHz band. However, the chipsets can be used on only one band at once. Therefore, it is a further object of the current invention to provide for a method by which an access point with such a dual band capability can dynamically switch between the two bands without losing any data.

Figure 2:
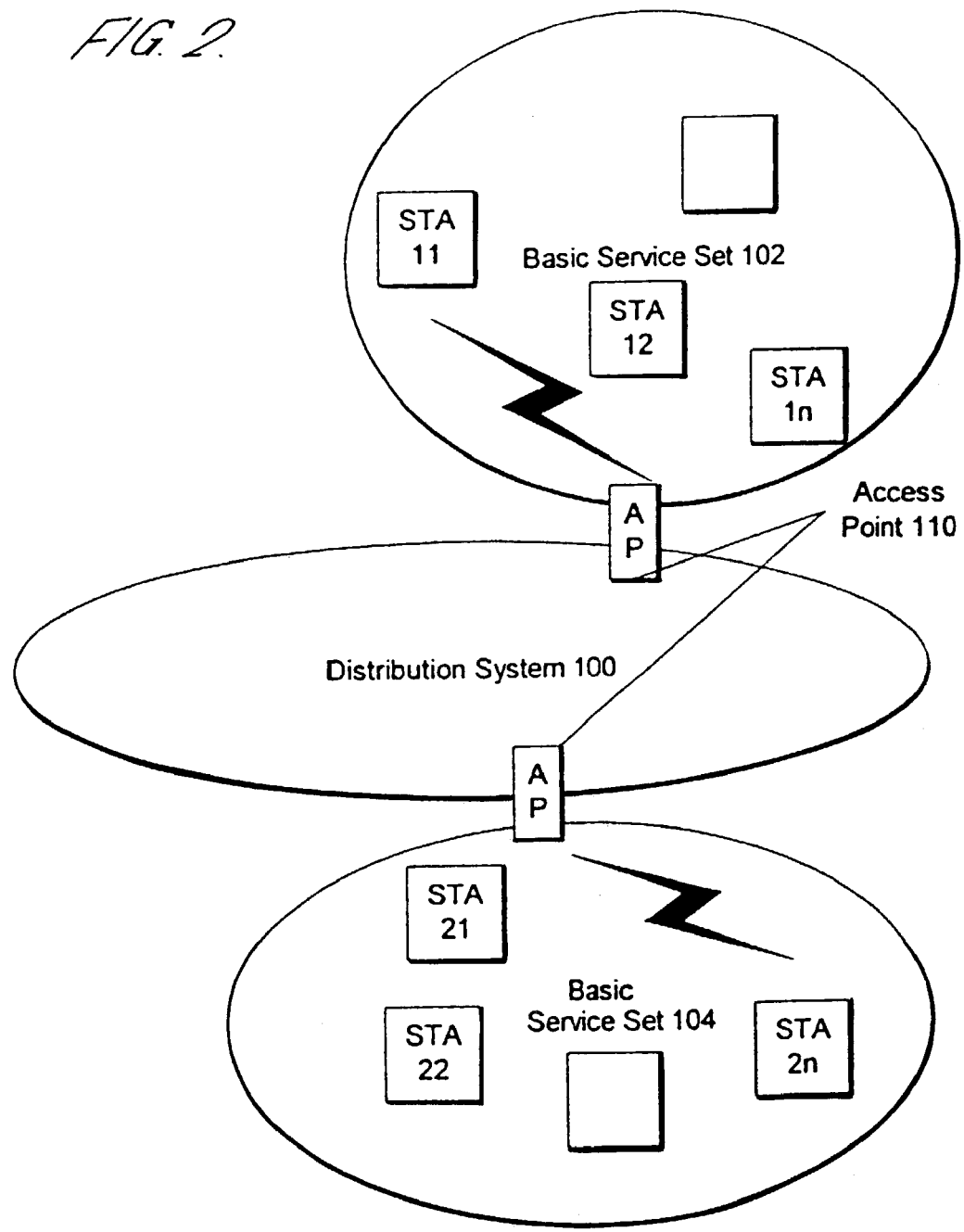
FIG. 2 shows an access point (AP) according to the present invention connecting a distribution system (DS) and a group of stations STAs.

A simple wireless LAN configuration is show in FIG. 2. A Distribution System (DS) 100, including a first basic service set (BSS) 102 and a second basic service set 104, all interconnected by an access point (AP) 110.

An Access point (AP) 110 controls communication between a wireless network and a wired network. Basic service sets 102 can be connected to each other by access points to form a Distribution System (DS) 100 which together can further form Extended Service Sets (ESSs).

In the current embodiment (FIG. 2) BSS 102 and BSS 104 have associated therewith a plurality of stations STA11, STA12, STA1n and STA21, STA22, STA2n, respectively. Initially, to join the wireless network an STA will acquire authentication and association with an AP in accordance with the 802.11 standard.

Figure 3:
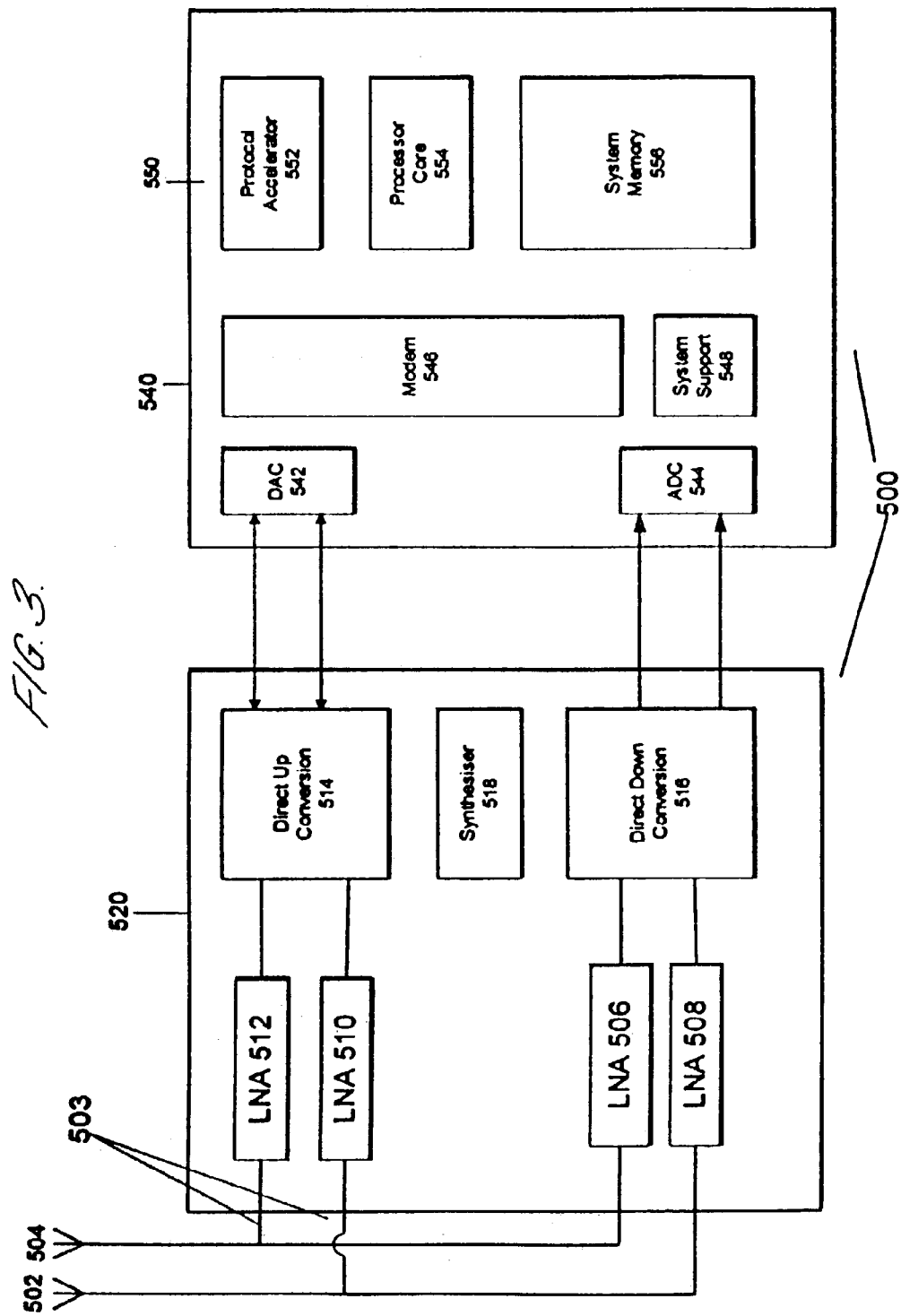
FIG. 3 shows a block diagram of the AP according to the present invention.

FIG. 3 shows the building block of a typical dual mode wireless LAN transceiver 500 for an access point in accordance with the present invention comprising: a dual band radio frequency (RF) portion 520 and a modem/MAC baseband portion 540 providing the functionality for system integration.

Referring to FIG. 3, the RF portion 520 comprises: antenna 502 for receiving a wireless LAN signals on the 2 GHz band; antenna 504 for receiving a wireless LAN signal on the 5 GHz band, power amplifiers (PA) 503; the RF front end including low noise amplifier (LNA) 506 for the 2 Ghz band and LNA 508 for the 5 GHz band, RF transmitter driver 510 for the 2 GHz band, RF transmitter driver 512 for the 5 GHz band; Direct Up Conversion block 514 utilised on the transmit path; Direct Down Conversion block 516 utilised on the receive path; and synthesiser 518 for supplying local oscillator inputs for both transmitter and receiver paths in both bands.

Referring to FIG. 3, the single base band chip (540) further comprising: analogue to digital converter (ADC) 544 and digital to analogue converter (DAC) 542, for interfacing with the receiver and transmitter portions respectively of the RF chip; modem 546 and support system 548, for orthogonal frequency division multiplexing (OFDM) and (CCK) digital signal processing for the receiver and the transmitter; and medium access control (MAC) portion (550) having a protocol accelerator unit 552, processor core unit 554; and system memory unit 556.

The front end interface comprising the ADC 544 and DAC 542 provides baseband I/Q receive inputs and transmits outputs along with a general purpose serial interface for configuration of the RF portion 520 and the PA module 503.

The wireless LAN baseband processor portion 540 has the MAC portion 550, which provides for operability within at least one wireless LAN network. The MAC portion 550 is supported by the hardware accelerator 552 which carries out the real time tasks of interpreting received packets or frames, for example acknowledgement frames, and then preparing and responding fast enough to deliver high data rate throughput. MAC software runs in the processor core unit 554 and data is buffered or stored therefrom in the system memory unit 556.

The modem unit 546 modulates and demodulates the signal and provides functionality between the front end of the baseband portion 540 and the MAC processor unit 550.

Figure 4:
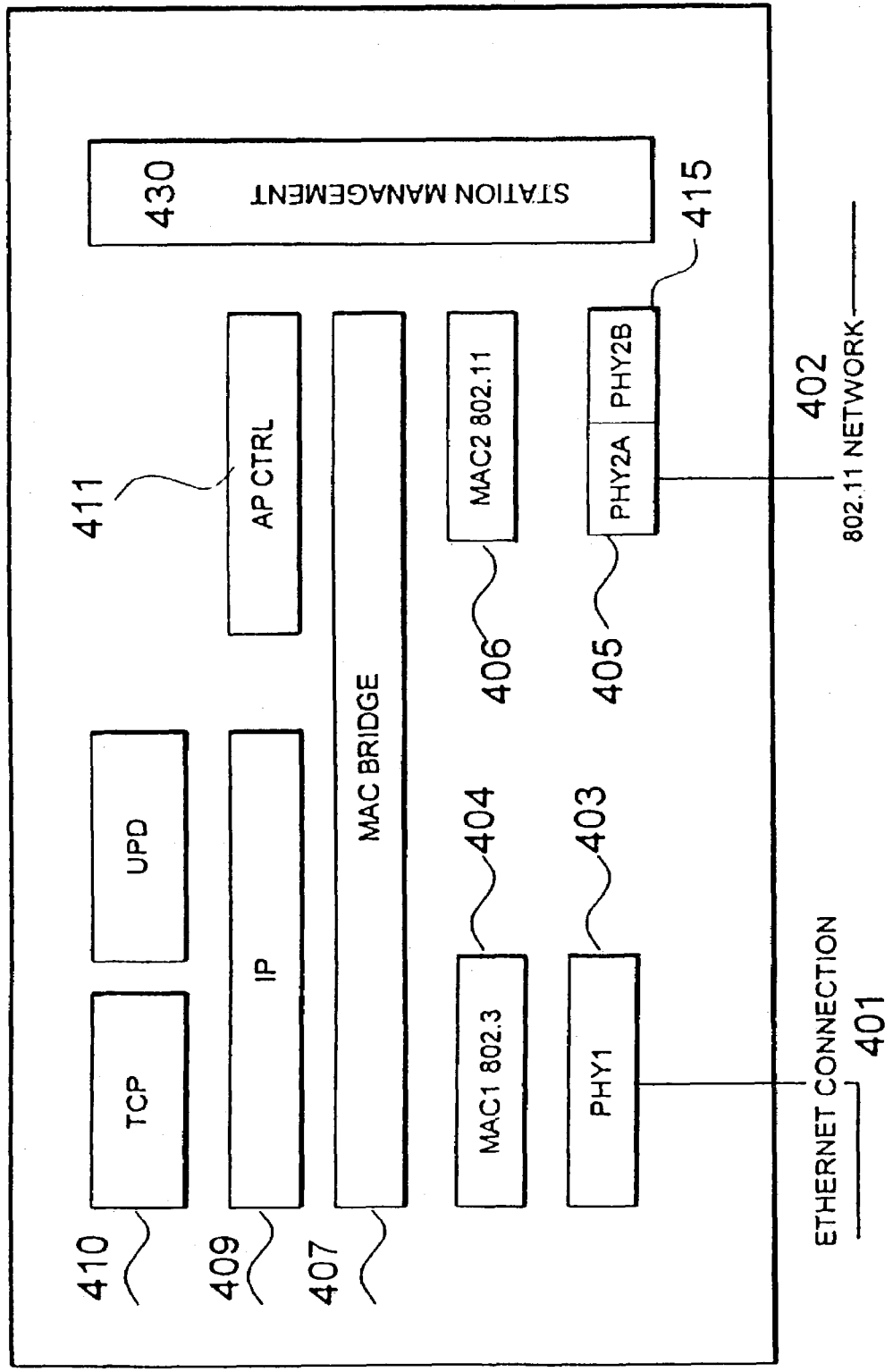
FIG. 4 shows the protocol layers provided within the AP of the present invention.

FIG. 4 shows the typical protocol layers provided within the access point of the current invention providing network. The access point 400 provides the interface between a wired network 401, for example, the Ethernet, in accordance with the 802.3 standard, and a wireless network 402 in accordance with one of the 802.11b or 802.11a standard.

Referring to FIG. 4, the functionality of the AP comprises: physical layer 403 and associated MAC layer 404 for providing the interface means to the wired medium; a physical layer 405 and associated MAC layer 406 for providing the interface means to the wireless medium; MAC bridge 407 for providing the connection between the wired LAN and the wireless LAN; antenna 408; network layer 409 supporting internet protocol (IP); transport layer 410 providing transmission control protocol (TCP) or user datagram protocol (UPD); application layer 420; network layer 411 supporting AP control; and station management layer 430 for interacting with PHY and MAC layers and is additionally responsible for MAC bridge control and interaction with the distribution system. In particular, the 802.11 MAC layer 406 has associated therewith two physical layers PHY2A 405 and PHY2B 415 which correspond to the 2 GHz band and 5 GHz bands respectively.

The principal operations of the MAC layer are to access the wireless medium, join a network, and to provide authentication and privacy. The intimate details of the MAC and the sub-layers thereof will be familiar to the skilled addressee.

To share a medium, the 802.11 standard provides a number of methods by which the AP can indicate to stations that they should not transmit data for a specified period of time. The said methods include: use of the Contention-Free Period; setting of the duration field in frames; use of the 802.11h 'Quiet' period; and not sending HCF polls.

If the access point simply alternated between the two bands, then it would not hear any data sent by the stations on the other band to the one it was currently active on, and this data could easily be lost. Therefore, it is a further object of the current invention to use one of the aforementioned mechanisms and variants thereof to instruct the stations on a particular band to cease transmissions for all of the period during which the access point will be servicing stations on the other band. It then switches back to this band just in time before the stations start to transmit again.

The 802.11 stations use MAC co-ordination to gain access to a network channel, and the half duplex nature of data transmission within the wireless network ensures that transmission occurs only one station at a time. Because it is impossible to detect a collision on a wireless LAN, access to the channel is controlled using a mechanism called carrier sense multiple access with collision avoidance (CSMA/CA), which mechanism incorporates an acknowledgement frame. CSNA/CA is a distributed mechanism specifically referred to within 802.11 as distributed co-ordination function (DCF), which can be implemented in the aforementioned IBSS and infrastructure network configurations.

The skilled addressee would recognise that in CSMA/CA mode the station determines whether another station is transmitting on a medium before initiating its own transmission. If the station senses that the medium is busy then the transmission of its frames is halted.

To escape the likelihood of a collision among stations sharing the same medium, the CSMA/CS implements a random back-off algorithm wherein, when the medium is dormant, the MAC protocol invokes the algorithm if a collision is sensed. Hence, minimising the probability that stations will collide on the medium. CSMA/CA provides pseudo-random sharing of the channel between the stations, but there are certain additional mechanisms that allow the access point to limit access to the channel of one or more stations.

Within the standard CSMA/CA protocol all the stations contend for access to the channel. The contention free period (CFP) is an alternative mechanism by which CSMA/CA is suspended where each station must wait for a specific request from the access point, called a poll, before transmitting a frame. In general the CFP will not be used all the time, but CFPs will alternate with periods called contention periods (CPs) during which CSMA/CA is used.

One of the advantages provided for in the current invention is that the stations will not transmit anything during a CFP unless requested to do so by the AP. Equally there is no requirement on the AP to send anything during this period, so the channel can be made dormant for a period of time.

Stations are prevented from transmitting because at the beginning of the CFP they set their network allocation vector (NAV) counter to a high value. This counter gradually decrements over time, and the station is not allowed to send frames, unless polled, while this value is above zero. At the beginning of the CFP the NAV counter is set to such a value that it will only reach zero when explicitly reset at the end of the CFP.

Figure 5:
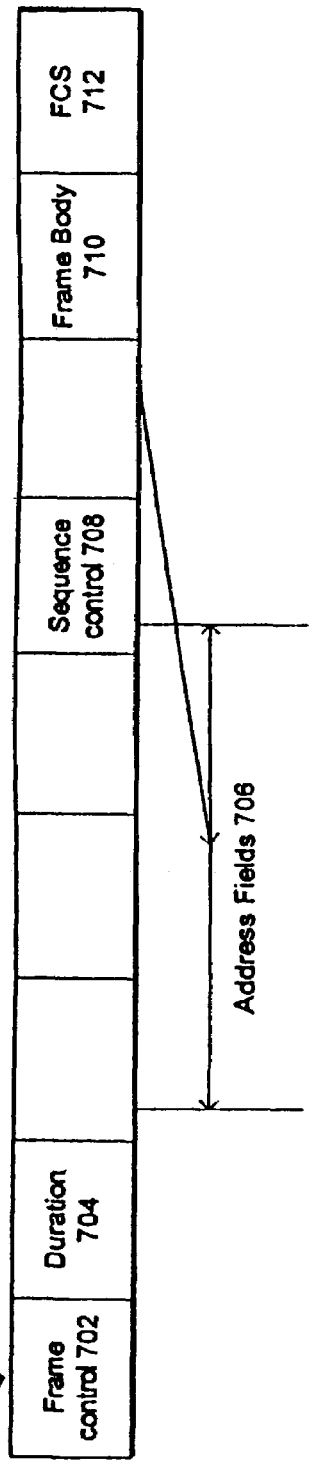
FIG. 5 shows a Medium Access Control (MAC) frame according to the present invention.

The 802.11 standard divides MAC frames into three broad categories: management frames, control frames and data frames, which have similar formats. Referring to FIG. 5, a typical MAC frame structure 700 comprises a frame control field 702, duration field 704, address fields 706, sequence control field 708, frame body field 710, and frame check sequence (FSC) 712.

The frame control field carries control information from one station to another. Assigned to the duration field is a duration value, which value depends upon the frame category, for example, in a data and acknowledgement (ACK) frame, the duration value at one station specifies the total duration of the next corresponding frames while other stations on the network monitor this field to delay transmission based on the duration value. Contents of the address fields and remaining portions of the MAC frame would be familiar to the skilled addressee.

Control frames provide functionality to facilitate the delivery of frames, and are composed of subtype: RTS frame is transmitted to a receiving station for a predetermined time set by the network allocation vector (NAV) value which behaves as a counter. The MAC sends a data frame and if it does not receive a ACK frame then it will retransmit the frame. Receiving an ACK frame provides no information about the state of the medium.

Control frames provide functionality to assist in the delivery of data frames between a transmitting and receiving frame. There is an alternative technique for setting the NAV counter in stations, which entails sending a value in the duration field present in many frames. The receiving stations will update their NAV counters with the received value, and will queue frames until the counter counts down to zero.

IEEE 802.11 provides for a mechanism using request to send (RTS) and clear to send (CTS) frames, specifically designed to provide this sort of channel reservation, but there are other frames that the duration field could be sent in.

The RTS/CTS procedure was added to 802.11 to provide protection against nodes that are in range of only one of the parties in a conversation, the so called hidden nodes. The problem is that the CSMA/CA mechanism depends heavily on the ability of a station to hear other transmissions when deciding when to transmit. If a station cannot hear a transmitter itself, it will go ahead with its transmission, and a station that is in the middle will hear a garbled mixture of the two transmissions.

To avoid this, the transmitting station can send an RTS frame with a requested reservation time that will be long enough to send the real frame. The receiving station acknowledges the RTS by sending a CTS frame that also includes the reservation period (though slightly reduced as time has moved on in the meantime). Stations hearing either one of these two frames will set their NAV counters to protect the following frame exchange.

In a preferred embodiment, the method of indicating to a station that the transmission of frames therefrom should not occur includes the 'quiet' period as defined in the draft 802.11h standard, which is an enhancement of the related processes of the 802.11 standard. The intended method of quieting a channel entails including a special information element in the periodic beacon frames that the AP sends to stations on that particular channel. Information elements define a regular period during which all the stations must not transmit on the channel.

Figure 6:
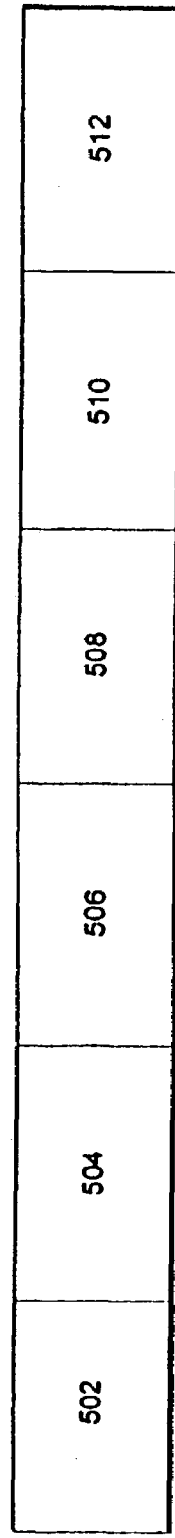
FIG. 6 shows the structure of an information element of the present invention.

Referring to FIG. 6, the structure of the information element 500 contains fields including element ID 502, length 504, quiet count 506, quiet period 508, quiet duration 510 and quiet offset 512. The information element was defined so that measurements could be made in an effort to detect radar emissions using the same channel. They were initially proposed for use in the 5 Ghz band only, but it is like that it will be possible to use these information elements in both the 2.4 GHz and 5 GHz bands.

Figure 7:
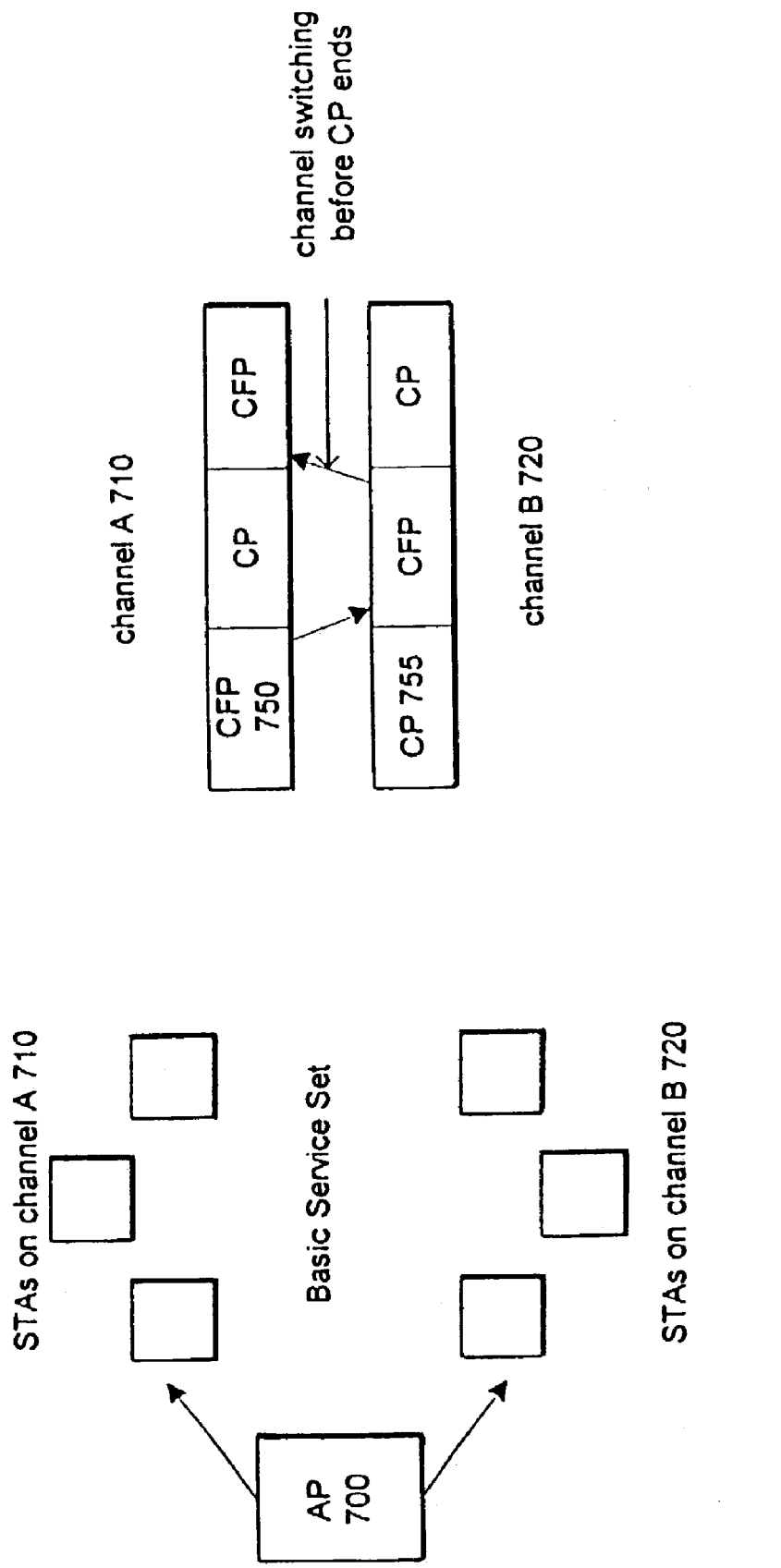
FIG. 7 shows the AP of FIG. 3 serving STAs on two channels, channel A and channel B, with channel switching between channels using the contention period and contention free period.

Referring to the embodiment in FIG. 7, the use of the CFPs and CPs are described wherein, the AP 700 interfaces with two groups of stations, group A 710 and group B 720 on two different channels, Channel A 710 and channel B 720.

The procedures that follow are initiated at the access point 700, as shown in FIG. 7: One of the aforementioned mechanisms are used to ensure that stations on channel A 710 do not transmit for a specified period, which period is assigned to CFP 750. Thereafter, the AP 700 invokes a switching means to switch itself from channel A 710 to channel B 720 in order to service the stations on channel B 720. It is during the contention period (CP) 755 that transmission and receipt of frames occurs between AP and STAs in accordance with CSMA/CA. Just before the termination of the specified period, again one of the mechanisms specified above is invoked to ensure that stations on channel B 720 do not transmit for a specified period. Then the AP 700 is instructed to switch to channel A 710, and service the stations on this channel.

Beacons frames carry information about the data capacity capabilities of the AP, and are sent out from the AP at regularly defined intervals. Each beacon frame contains a delivery traffic indication map (DTIM) element Certain information in the beacon frame is invariable, such as the AP addresses and AP identification parameters, while the only variable is the DTIM field which contains critical timing information.

The beacon frames transmitted from the APs contain a list known as a traffic indication map (TIM) of all the stations having buffered frames at the AP. A sending station can instruct an AP not to transmit frames for a predetermined period of time. The DTIM field determines how often the beacons contain traffic indication maps (TIMS) that are DTIMS.

In the current invention CPF is used is used to instruct 802.11a stations not to transmit frames while the AP switches to serve the 802.11b stations and vice versa. The time period permitting the station to transmit frames to the AP is subdivided into a mini-CFP where a privileged STA in a band (802.11a or 802.11b) can have priority over others STAs. Hence the mini-CFP is referred to as True Contention Free Period (TCFP) and when not in use the remainder or the whole of the period is called the False Contention Free Period (FCFP).

Figure 8:
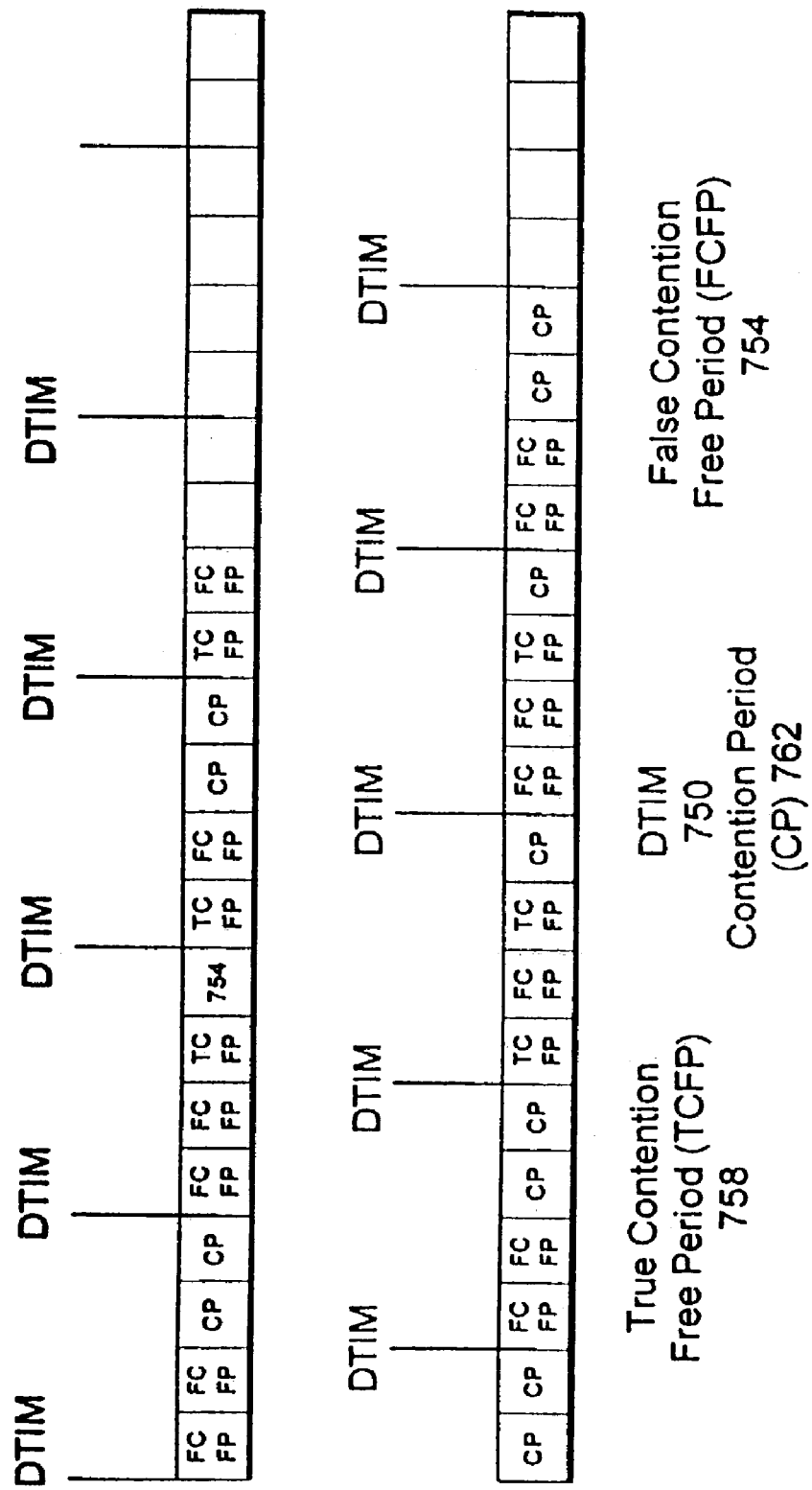
FIG. 8 shows a delivery traffic indication map, according to the present invention.

Referring to the embodiment of the invention in FIG. 8, the DTIM field 750 in the frame defines a False Contention Free Period (FCFP) 754 which prevents transmissions by STAs. If an AP sends has CF data to be sent, it can add a True Contention Free Period (TCFP) 758 to the end of the FCFP and use this time to send frames to power save STAs on either band. During FCFP 754 on one band, the AP will receive frames from STAs using the contention protocol on the other band. STAs can send frames either during CP 762 or during TCFP 758, but only when instructed to do so by the AP. Hence, the perceived throughput seen by STAs on a band is reduced, probably not noticeably in normal use. This is compliant with the standard. The FCFP 754 must end on a beacon boundary 750 because this marks the DTM beacon on the other band, while TCFPs do not require this feature.

A station within a BSS can transmit a frame to all the stations within its range to set their network allocation vector (NAV) counters to a particular value by including the value in a CTS frame sent to itself. In the current embodiment, an access point within a BSS station having a non-zero NAV value will cause all the receiving stations within range to buffer any frames they have for transmission until the NAV counter counts down to zero. The NAV counter operates like a timer starting with a non-zero value which indicates the earliest point in time at which the station can access the medium. When the NAV value reaches zero, the station can transmit in the allocated channel if the PHY co-ordination indicates a clear channel.

Figure 9:
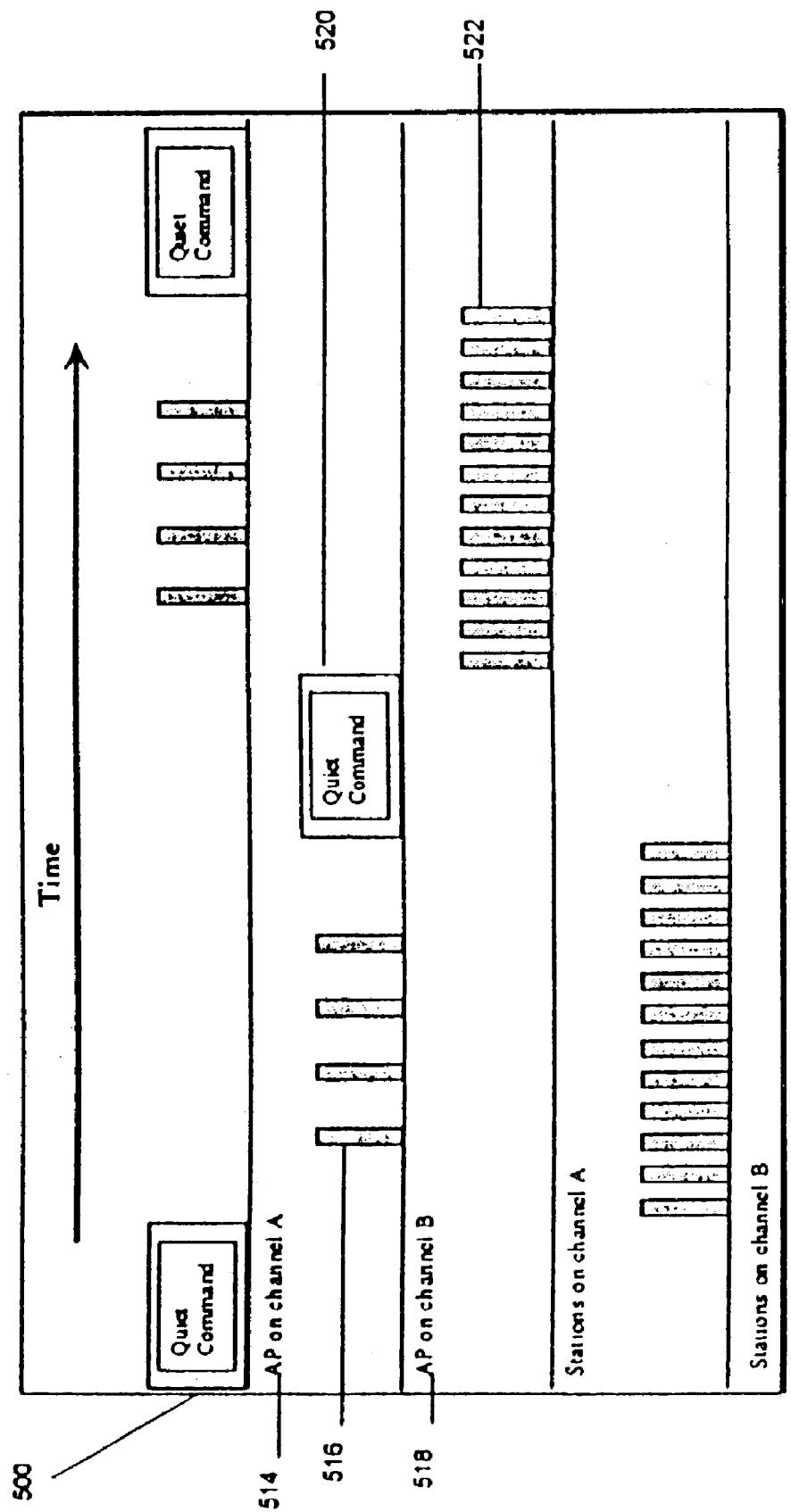
FIG. 9 shows the AP of FIG. 3 serving channels A and B incorporating, for example the quiet period.

Referring to FIG. 9 of the current embodiment, there exist two groups of stations, namely group A and group B, each group operating on a different channel, channel A and channel B respectively. Each group will only hear the clear to send (CTS) frame if it is sent on the channel on which they are operating; hence, using this technique it is possible to quiet the stations on one channel only.

In the current embodiment, the AP controls the two groups of stations, each on a different channel. The AP can provide service simultaneously to both groups using the repeatable mechanism described herein. Initially the AP on channel A 514 sends a CTS frame to itself, specifying a duration of, for example, 100 ms. This will cause all the stations in group A to set their NAV counters to the specified value, and hence cease all frame transmissions for the next 100 ms, this is represented by the quiet command 500.

Knowing that there will be no traffic on channel A 512 for 100 ms, the AP 516 can retune to channel B. The access point on channel B 518 retunes just in time for the target time for it to send its periodic beacon frame on channel B wherein the beacon period should be set to 200 ms.

The NAV counter of the stations on channel B 516 will reach zero at exactly this point, and they will begin transmissions again. The channel then operates as normal for the remainder of the 100 ms, with traffic passing in both directions between the AP and the stations 516 on channel B.

Just before the end of the 100 ms, the AP sends a CTS frame to itself on channel B, specifying a duration of 100 ms. This will cause all the stations in group B to set their NAV counters to the specified value, and hence cease all frame transmissions for the next 100 ms as expressed in the quiet command 520.

Thereafter, the AP retunes to channel A, just in time for the target time for it to send its periodic beacon frame on channel A. The NAV counter of the stations on channel A will reach zero at exactly this point, and they will begin transmissions again. The channel then operates as normal by serving stations on channel A 522 for the remainder of the 100 ms, with traffic passing in both directions between the AP and the stations on channel A.

The system then reverts to the initial steps.

The current embodiment uses a predetermined alternating period of 100 ms on each channel in order to provide service to each channel. Smaller or longer periods may be used, or the balance between the two periods could be altered if the traffic balance between the two groups is not equal.

The current invention could work equally well where two channels of the same technology are in use, for example, 802.11a or 802.11b. The principal advantage of the current invention is that it allows provision of service to both 802.11a and 802.11b stations without the need for separate MAC interfaces in the AP. The current invention allows dynamic load balancing between the two populations. Moreover, multiple channels can be employed with three or more-way interleaving. Thus, a single multi-mode access point can be employed to allow data handling on, say, 802.11a, 802.11b and also the new proposed 802.11g standard.

Additionally, it is known that each station may further contain a memory store under the control of the MAC layer and a second transceiver, under the control of a second MAC layer for communicating with an access point using a second channel. The second MAC layer may also have access to the memory store.

Although the foregoing has been described communicating with a group of clients, it is understood that the invention is not so limited. For example, a single station, containing a first and second transceiver, may utilise the access point of the present invention.

It will be apparent to the skilled addressee that further modifications may be made without departing from the scope of the claims.

What is claimed is:

1. A method of controlling access between a multi-mode access point for a Wireless Local Area Network (WLAN), and first and second client transceivers located in at least one client, the multi-mode access point having a Medium Access Control (MAC) layer which is arranged to communicate with both the first and second client transceivers over a first and second channel respectively, the method comprising:

(a) commanding, by the multi-mode access point, the said first client transceiver not to transmit data frames to the multi-mode access point over the first channel during a first time period $t_0$;

(b) switching the multi-mode access point to receive data frames from the said second client transceiver over the second channel during the first time period $t_0$;

(c) commanding, by the multi-mode access point, the said second client transceiver, prior to the expiration of said first time period t₀, not to transmit data frames to the multi-mode access point over the second channel during a second time period $t_1$; and (d) switching the multi-mode access point, upon expiration of said first time period t₀, to receive the data frames from the said first client transceiver over the first channel during said second time period $t_1$.

2. A method as claimed in claim 1, wherein there is a plurality of clients, the method further comprising:
communicating between at least one of the clients and the multi-mode access point only over the said first channel.

3. A method as claimed in claim 1, wherein there are a plurality of clients, the method further comprising:
communicating between at least one of said clients and the multi-mode access point only over said second channel.

4. A method as claimed in claim 1, wherein the, or one of the, clients comprises both a first and a second client transceiver, the method further comprising:
communicating between an access point and at least one client using both the first and second channels.

5. A method as claimed in claim 1, further comprising:
storing, in a queue, at the first client transceiver, the data frame or data frames not transmitted by the first client transceiver during the first time period $t_0$, respectively; and
transmitting, after the expiration of said first time period $t_0$, the data frame(s) from the first client transceiver to the multi-mode access point.

6. A method as claimed in claim 1, further comprising:
storing, in a queue, at the second client transceiver, those data frames not transmitted by the second client transceiver during the second time period $t_1$; and
transmitting, after the expiration of said second time period $t_1$, at least one of said queued data frames from the second client transceiver to the access point.

7. A method as claimed in claim 1, further comprising:
including data indicative of either said first or second time periods in at least one of the data frames transmitted during each respective time period.

8. A method as claimed in claim 1, comprising:
transmitting time data between said first client transceiver of a first client and of said first client transceiver of a second client, the time data being indicative of either the first or second time period.

9. A method as claimed in claim 7, wherein said data is a non zero value, and the method further comprises:
altering the non zero value by a predetermined amount; and
transmitting the or each data frame when said value reaches a predefined threshold.

10. A method as claimed in claim 7, wherein said data is a Network Allocation Vector (NAV) value.

11. A method as claimed in claim 1, wherein the first and second time periods are each divided into a True Contention Free Period and a False Contention Free Period.

12. A method as claimed in claim 1, for controlling access between the multi-mode access point and at least one further client transceiver within the at least one client, the method further comprising:
commanding the or each further transceiver not to transmit data frames to the multi mode access point either, during either the first time period $t_0$ or the second time period $t_1$;
commanding both the first and the second transceivers, prior to the expiration of the time period $t_1$ not to transmit data frames during a third period of time $t_2$; and
switching the multi-mode access point, upon expiration of the second time period $t_1$, so as to receive data frames from the, or one of the, further client transceiver(s) during the third period of time $t_2$.

13. A multi-mode access point for controlling the access of first and second client transceivers located in at least one client, to a Wireless Local Area Network (WLAN), the multi-mode access point comprising:
an access point transceiver arrangement including first and second access point transceivers, arranged to communicate with the first client transceiver on a first channel and second client transceiver on a second channel; and
an access point Medium Access Control (MAC) layer, in communication with the access point transceiver arrangement, the MAC layer being arranged to
instruct the first access point transceiver to transmit a first command signal to the said first client transceiver, the first command signal instructing said first client transceiver not to transmit a data frame to the access point over the first channel during said first period of time $t_0$,
switch the second access point transceiver to receive data frames exclusively from the said second client transceiver over the second channel during a first time period $t_0$,
instruct the second access point transceiver to transmit a second command to the said second client transceiver, prior to the expiration of said first time period $t_0$, the second command signal instructing said second client transceiver not to transmit data frames to the access point over the second channel during said second time period $t_1$, and,
upon expiration of said first time $t_0$, being further arranged to switch the first access point transceiver exclusively to receive data frames from only the said first client transceiver over the first channel for a second time period $t_1$.

14. An access point as claimed in claim 13, further comprising:
a memory, accessible by said first and second access point transceivers, arranged to store, in a queue, the frames not transmitted to the first client transceiver or second client transceiver during the first or second time periods $t_0$, $t_1$, respectively.

15. An access point as claimed in claim 14, wherein said first or second access point radio transceiver is arranged to transmit to the first or second client transceiver, during the second or first time periods respectively, the frames not transmitted thereto during said first or second time periods respectively.

16. An access point as claimed in claim 13, wherein the access point transceiver arrangement includes at least one further access point transceiver arranged to communicate with a corresponding at least one further client transceiver on a corresponding further channel, respectively, the Medium Access Control (MAC) layer being further arranged to switch the further access point transceiver to receive data frames only from the further client transceiver, during a further time period $t_2$, whilst reception of data frames at the first and second access point transceivers is suppressed.

17. A Wireless Local Area Network client to communicate with an access point, the Wireless Local Area Network client comprising:
at least one first client transceiver arranged to communicate with the access point using a first channel;
a first client MAC layer, in communication with the first client transceiver, arranged to instruct the first client transceiver not to transmit data frames to the access point over the first channel during the first time period $t_0$ in response to a first command from the access point;

at least one second client transceiver, in communication with a second client MAC layer, the second client transceiver being arranged to communicate with the access point using a second channel; and the second client MAC layer being arranged to instruct the second client transceiver, prior to the expiration of said first time period $t_0$ and in response to a second command from the access point, not to transmit data frames to the access point over the second channel during a second time period $t_1$.

18. A client as claimed in claim 17, wherein the first and second client MAC layers are further arranged to switch the first and second client transceivers to transmit the data frames from each respective transceiver to the access point as the access point switches the first and second access point transceivers to receive the data frames from the first client transceiver and second client transceiver, respectively.

19. A client as claimed in claim 17, further comprising:

a memory, in communication with the first client MAC layer, arranged to store, in a queue, the frames not transmitted by the first client transceiver, during the first time period $t_0$.

20. A client as claimed in claim 19, wherein said memory is in communication with the second client MAC layer and, where said memory is further arranged to store, in a queue, the frames not transmitted by the second client transceiver, during the second time period $t_1$.

21. A client as claimed in claim 17, wherein said first client MAC layer is further arranged to instruct said access point to transmit a first client command signal to the said first client transceiver in at least one other client, the first station command signal instructing said first client transceiver not to transmit said data frames to the access point during said first time period $t_0$.

22. A client as claimed in claim 17, wherein said second client MAC layer is further arranged to instruct said access point to transmit a second command signal to the said second client transceiver in the or each other client, prior to the expiration of said first time period to, the second client command signal instructing said second client transceiver not to transmit said data frames there to the access point for said second time period $t_1$.

23. A client as claimed in claim 17, wherein when said first time period $t_0$ or said second time period $t_1$, is represented by a non zero number, and the station further comprises:

a counter to alter the value of said non zero value by a predefined value thereby generating a resultant value; and wherein, the first client transceiver transmits said data frames therefrom when said resultant value reaches a predetermined value.

24. A network comprising:

a server in communication with at least one access point, wherein the access point includes an access point transceiver arrangement including first and second access point transceivers, arranged to communicate with a first client transceiver on a first channel and a second client transceiver on a second channel; and an access point Medium Access Control (MAC) layer, in communication with the access point transceiver arrangement, the MAC layer being arranged to instruct the first access point transceiver to transmit a first command signal to the said first client transceiver, the first command signal instructing said first client transceiver not to transmit a data frame to the access point over the first channel during said first period of time $t_0$, switch the second access point transceiver to receive data frames exclusively from the said second client transceiver over the second channel during a first time period $t_0$, instruct the second access point transceiver to transmit a second command to the said second client transceiver, prior to the expiration of said first time period $t_0$, the second command signal instructing said second client transceiver not to transmit data frames to the access point over the second channel during said second time period $t_1$, and, upon expiration of said first time to, being further arranged to switch the first access point transceiver exclusively to receive data frames from only the said first client transceiver over the first channel for a second time period $t_1$.

25. A client as claimed in claim 17, wherein said first client MAC layer is further arranged to instruct said first access point transceiver to transmit a first client command signal to the said first client transceiver in at least one other client, the first station command signal instructing said first client transceiver not to transmit said data frames to the access point during said first time period $t_0$.

* * * * *